Feb. 27, 1934.   J. H. KASTEN ET AL   1,949,163
INVALID VEHICLE
Filed April 12, 1932   4 Sheets-Sheet 1

Inventor
Joseph H. Kasten,
Henry McIntosh,
By Clarence A. O'Brien
Attorney

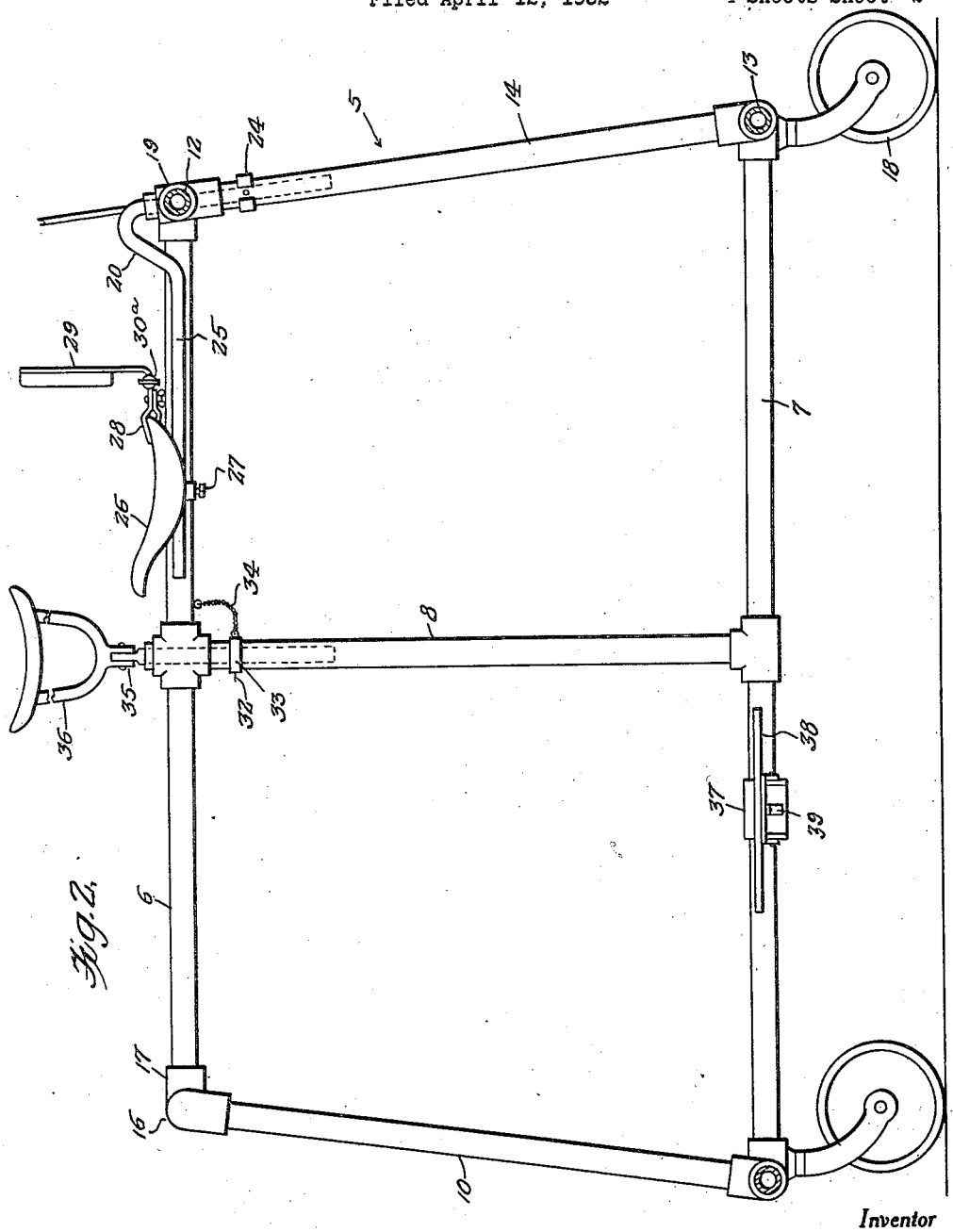
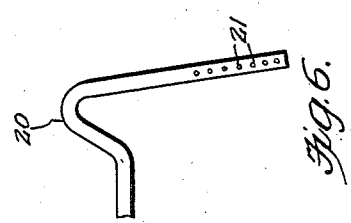

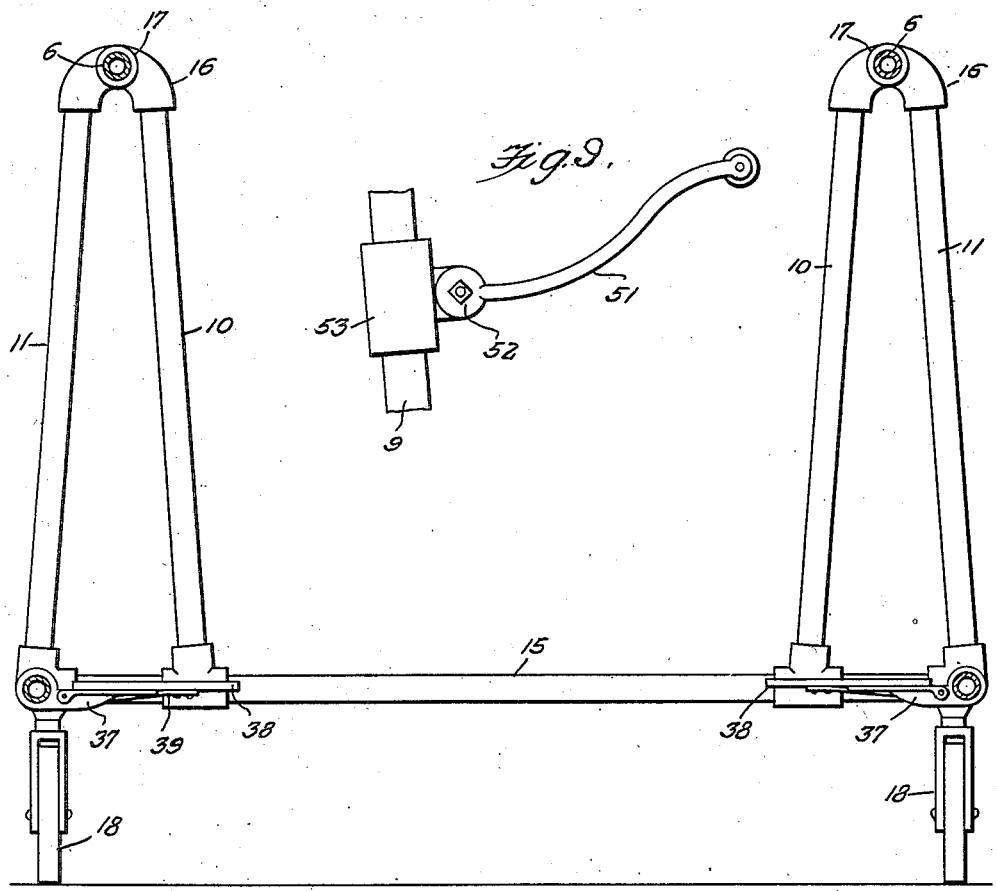
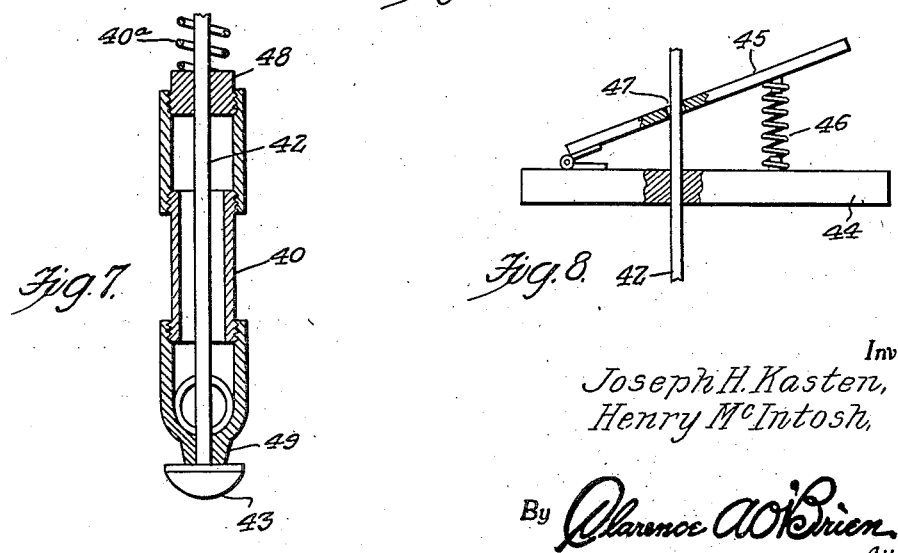

Feb. 27, 1934.　　J. H. KASTEN ET AL　　1,949,163
INVALID VEHICLE
Filed April 12, 1932　　4 Sheets-Sheet 4

Inventor
Joseph H. Kasten
Henry McIntosh
By Clarence A. O'Brien
Attorney

Patented Feb. 27, 1934

1,949,163

UNITED STATES PATENT OFFICE 1,949,163

INVALID VEHICLE

Joseph H. Kasten and Henry McIntosh, Hicksville, N. Y.

Application April 12, 1932. Serial No. 604,813

5 Claims. (Cl. 155—22)

Our invention relates generally to vehicles for invalids, and particularly to an improved vehicle of this type which will enable an invalid to move about from place to place while his legs are impaired, and he is otherwise too weak or disabled for walking.

It is an important object of my invention to provide an invalid vehicle of the type described which is of simple and rugged construction, and which is adjustable so as to accommodate invalids of different sizes and conditions.

Other objects and advantages of our invention will be apparent from a reading of the following description in connection with the drawings, wherein for purposes of illustration we have shown a preferred embodiment of the invention.

In the drawings:

Figure 2 is a vertical longitudinal sectional view through Figure 1 showing the inward side of one side of the embodiment.

Figure 3 is a transverse vertical sectional view through Figure 1 looking toward the front end of the embodiment.

Figure 6 is a side elevational view of the vertically adjustable seat support.

Figure 7 is a transverse vertical sectional view through one of the brakes.

Figure 8 is a sectional elevational view of one of the brake locking means.

Figure 9 is a side elevational view of an adjustable handle for enabling pushing of the device by an attendant.

Figure 1:
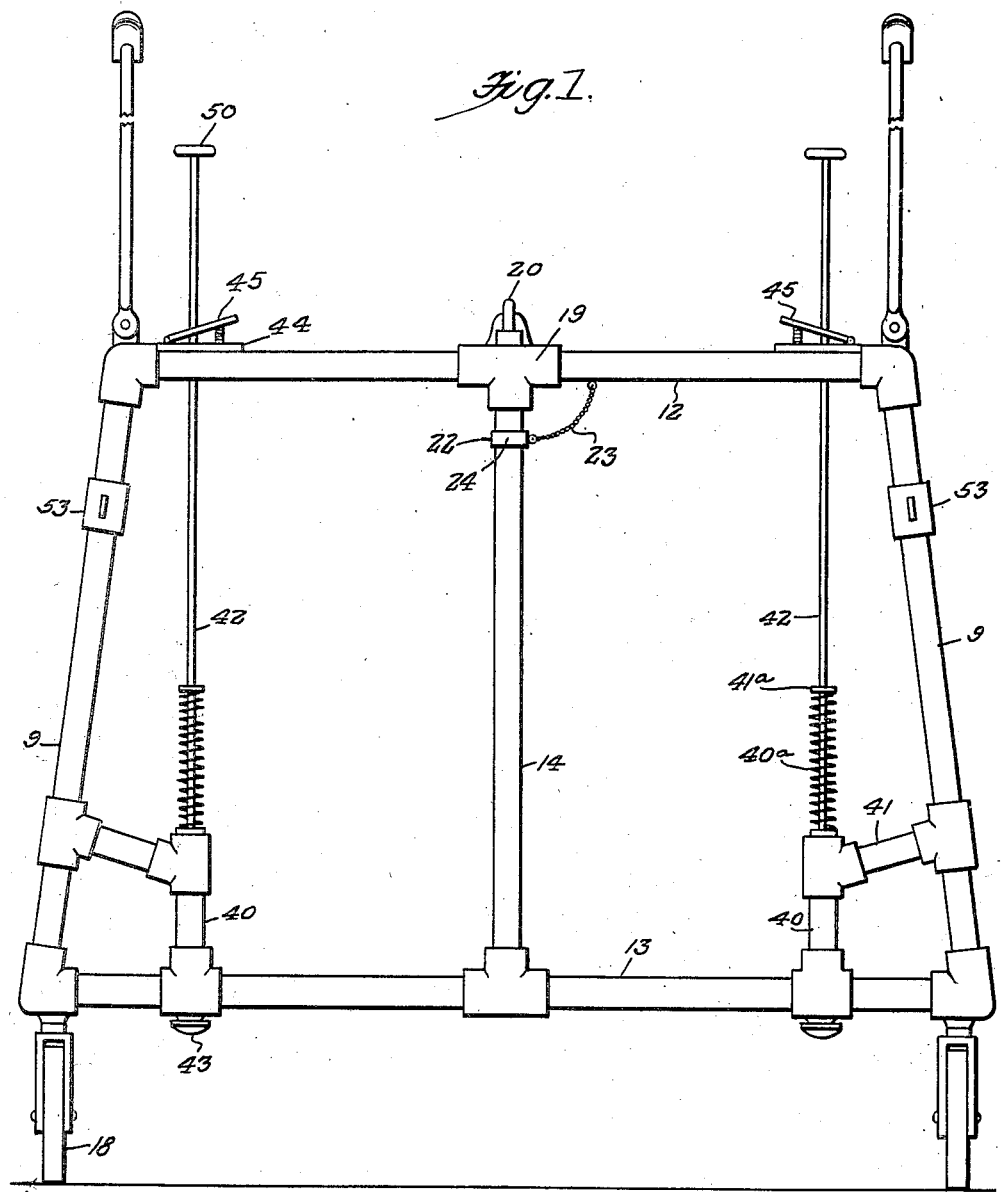
Figure 1 is a rear end elevational view of the embodiment.
Figure 5:
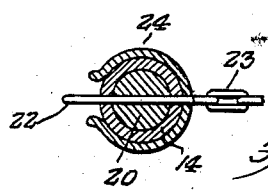
Figure 5 is a horizontal sectional view through the seat mounting showing adjusting means.
Figure 4:
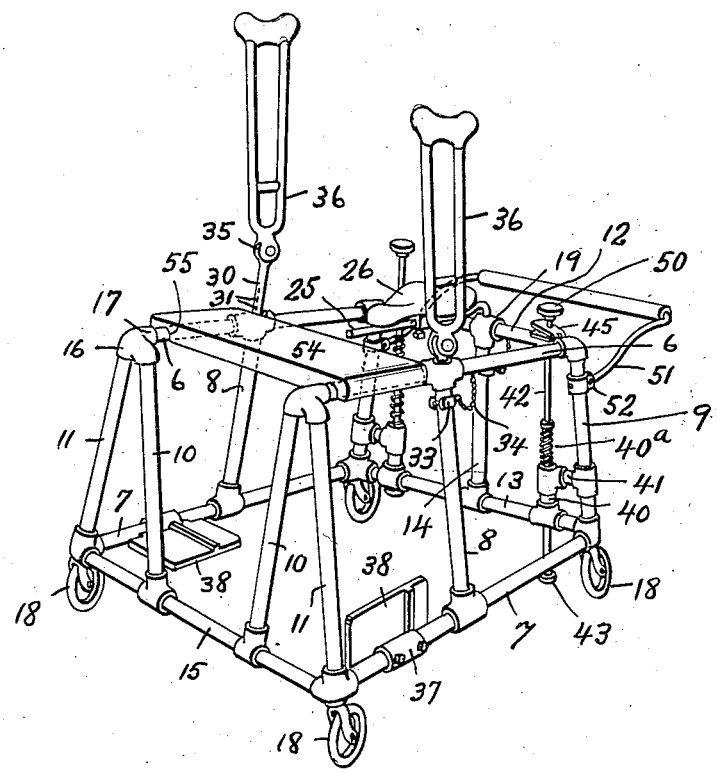
Figure 4 is a perspective view of the embodiment.

Referring in detail to the drawings, wherein like numerals refer to like parts throughout the same, the numeral 5 generally refers to the frame of the device which comprises vertically spaced upper and lower longitudinal side members 6 and 7 connected together at intermediate points by vertical members 8. The rear ends of the upper and lower side members are connected by upwardly and inwardly leaning vertical members 9. The front ends of the upper and lower side members are connected by upwardly and inwardly leaning vertical members 11. The rear ends of the upper side members 6 are connected by upper transverse member 12, while the rear ends of the lower side members 7 are connected by the lower transverse member 13. A vertical member 14 is connected between intermediate points of the upper and lower transverse members 12, 13. A front cross member 15 is connected between the front ends of the lower side members 7. Vertical braces 10 are connected between points on the front cross member 15 inwardly spaced from its ends and the front end of the upper side members 6.

Y-couplings 16 have downwardly directed arms which receive the upper end of the vertical front members 10, 11 and a rearwardly extending neck 17 which receives the forward end of the upper longitudinal side member 6. All of the vertical, longitudinal side, intermediate, vertical, and cross members are preferably tubular in form. Where the members meet they are connected by unions such as Y and T-couplings and the like, as required, as shown in the drawings.

To the under side of the fittings at the lower corners of the frame, casters, 18 are secured for movably mounting the frame, and enabling it to be shifted from place to place and moved in all directions easily.

Vertically telescoped into the T-fitting 19 which connects the upper end of the vertical member 14 with the upper rear cross member 12 and into the member 14 is an adjustable seat support 20, a side elevational view of which is shown in Figure 6, wherein it is shown provided with a series of vertically spaced holes 21 for receiving a locking pin 22 which for convenience is carried by a chain 23 attached to a suitable portion of the frame so that it may be easily inserted and withdrawn from a hole in the vertical member 14 for entering a selected one of the holes in the seat support 20. A spring clip 24 is provided for embracing the vertical member 14 for holding the locking pin in place. On the horizontal portion 25 of the seat support 20 there is forwardly and backwardly slidably carried the saddle seat 26 which has the set screw adjustment 27. The rear end of the seat may be provided with a clamp 28 to which is swingably and adjustably connected the back 29, the adjusting means of which is indicated at 30a. With the described arrangement the seat support 20 is vertically adjustable and lockable in adjustable position, and the seat saddle is forwardly and rearwardly adjustable, and the back 29 is angularly adjustable with respect to the saddle.

Arranged to telescope into the upper end of each intermediate vertical side member 8 is a shank 30 provided with a series of vertically spaced holes 31 like those in vertical portion of the seat support 20. The members 8 are provided with a hole for receiving a spring clip equipped pin 32 arranged to be passed through the opening in the vertical member 8 and into a selected one of the holes 31 in the shank 30 whereby the shank 30 may be adjusted and locked in different elevated positions with respect to the frame. A clip 33 similar to the clip 24 is provided for the pin 32 as well as a chain 34. As the structure being described is the same on either side of the frame, description of one will suffice for both. Upon the upper end of the shank 30 is provided a knuckle generally designated 35 which permits side to side adjustment of a crutch member 36 which extends thereabove.

On each lower longitudinal side member 7 forwardly of the intermediate vertical member 8 is a foot rest 38 swingable from the vertical position to the horizontal position shown in Figure 3 in which it is supported by the bracket 37 carried on the lower longitudinal side member 7. A latch spring member 39 secured to the underside of the foot rest 38 engages a flat portion on the bracket 37 when the foot rest is in a vertical position, in such a way as to maintain the foot rest releasably in this position and out of the way.

Figure 1 shows short vertical members 40 which are mounted on the rear lower cross member 13 inwardly of the outer ends thereof and which are also connected by means of the short lengths 41 with the rear vertical members 9 whereby to be rigidly supported. Telescoped through each upright 40 is a braking rod 42 which has on its lower end a shoe 43 and on its upper end a portion which is slidable through a plate 44 on which a swingable lever 45 is secured. The lever 45 is normally pressed upwardly by a spring 46 into angular relationship with the plate 44 whereby to bear the sharp edges of an opening 47 in the lever through which the upper part of the rod passes, against the rod whereby to retain the rod against undesired downward movement from an upwardly positioned relationship with the ground. The lower portion of the rod 42 is passed through a nut 48 threaded into the upper end of the upright 40 and extends through a conforming opening in a reduced lower part 49 below the lower cross member 13. The upper end of the rod is provided with a handle 50 for manipulating the rod 42 so as bring the shoe 43 into and out of engagement with the ground. Depressing the lever 45 will release the rod 42 so that it may be freely manipulated. The spring 46 will return the lever 45 into rod holding relation when the lever 45 is released from depressed condition.

A suitable spring 40a circumposed on the rod 42 works against a collar 41a on the rod and the nut 48 on the upper end of the upright 40 for maintaining the rod 42 normally in an upward position with its shoe 43 raised out of engagement with the ground.

If desired, an adjustable handle 51 adjustably connected as indicated at 52 may be mounted on the rear vertical members 9 by means of sleeves 53 whereby the frame may be trundled by an attendant when this is desired.

A suitable tray 54 may be provided with transverse openings 55 in its sides whereby to receive the upper longitudinal side members 6 in front of the seat 26 so as to be securely mounted upon the frame to act as a table for the convenience of the invalid. This construction provides for easy removal and installation of the tray 54, and by providing it wide enough to extend substantially between the intermediate vertical side members 8 and the unions 16, unwanted sliding of the tray on the frame will be prevented.

With the construction described it will be obvious that a patient or invalid may leave his bed and seat himself upon the seat and use the crutch members before he is strong enough to walk, and that by using his feet against the ground for propelling the vehicle from place to place he is enabled to secure an amount of exercise not otherwise available. It will also be obvious that by means of the vehicle of our invention a patient or invalid is enabled to attend to his own wants where facilities are located at a distance from the bed. The patient or invalid may leave his bed by grasping the upper members of the frame and guiding and supporting himself into a position within the same and then instead of being required to turn himself around, he may easily move the frame upon its casters that he may seat himself without further movement. When he is ready to seat himself upon the seat, the brakes are moved into braking relation with the ground so as to maintain the frame against shifting while the invalid is adjusting himself thereon. The crutch members greatly facilitate an invalid in a weak condition while he is unable to get about even with the aid of an ordinary pair of crutches. The construction of the frame is such that an invalid may transport himself from place to place for different purposes and when there arrived may move himself from the seat of the frame and return thereto. As stated, if desired the vehicle may be trundled by an attendant, the handle 51 being provided for this purpose.

Though we have shown and described herein a preferred embodiment of the invention, it is to be definitely understood that we do not desire to limit the application of the invention thereto, but any change or changes may be made in material, and in structure and arrangement of parts within the spirit of the invention and the scope of the subjoined claims.

Having thus described our invention, what we claim as new is:

1. In a wheeled support for an invalid, a frame mounted on casters, crutch means mounted on intermediate portions of either side of the frame, seat means supported from and extending forwardly of an upper rear portion of the frame and located to the rear of said crutch means, ground engaging brake means carried by a lower rear portion of the frame, brake operating means on said upper rear portion of the frame at each side and to the rear of the seat means so as to be conveniently operable by the invalid occupying the seat, and foot rest means mounted on opposite sides of the frame, the foot rest means being hinged to swing inwardly into operative position.

2. A wheeled support for an invalid comprising a frame consisting of two sides and a back, each of said sides comprising a pair of upper and lower longitudinal members, an intermediate vertical member connecting and spacing the upper and lower longitudinal side members, a vertical corner member connecting the ends of the said side members at each end, said back comprising a pair of upper and lower vertically spaced transverse members, a rear intermediate vertical member connected to and between said upper and lower transverse members, the opposite ends of said upper and lower transverse members being secured to the rear corner members, seat means extending from the upper rear cross member, a lower cross member having its opposite ends secured to and between the front corner members, and a brace member secured to and extending from an inward part of said lower cross member to join the upper end of the front corner member and the front end of the upper longitudinal member on each side of the frame.

3. A wheeled support for an invalid comprising a frame comprising upper and lower longitudinal side members, upper and lower rear cross members connected therebetween, a lower front cross member connected between the front end of the lower longitudinal side members, vertical members connecting and spacing the upper and lower longitudinal side members, intermediate vertical members between the vertical members and connected to and between intermediate portions of the upper and lower side members, a rear intermediate vertical member connected to and between the upper and lower rear cross members, seat means extending forwardly from the upper rear cross member, and casters at the junctures of the lower longitudinal side members with the lower rear cross member and front cross member, ground engaging brake means carried by the upper and lower rear cross members, crutch means carried by the frame and extending from the upper longitudinal side members, portions of the crutch means being telescoped through openings in the upper side members into the intermediate vertical members whereby to be steadied.

4. A wheeled support for an invalid comprising a frame comprising upper and lower longitudinal side members, upper and lower rear cross members connected therebetween, a lower front cross member connected between the front ends of the lower longitudinal side members, vertical members connecting and spacing the upper and lower longitudinal side members, intermediate vertical members between the vertical members and connected to and between intermediate portions of the upper and lower side members, a rear intermediate vertical member connected to and between the upper and lower rear cross members, seat means extending forwardly from the upper rear cross member, and casters at the junctures of the lower longitudinal side members with the lower rear cross member and front cross member, ground engaging brake means carried by the upper and lower rear cross members, crutch means carried by the frame and extending from the upper longitudinal side members, and brace means extending between and connected to the front lower cross member and the junctures of the upper longitudinal side members and the front vertical members, said brace means being transversely spaced to afford easy entrance into the frame.

5. A wheeled support for an invalid comprising a frame comprising upper and lower longitudinal side members, upper and lower rear cross members connected therebetween, a lower front cross member connected between the front ends of the lower longitudinal side members, vertical members connected to the ends of and spacing the upper and lower longitudinal side members, intermediate vertical members between said vertical members and connected to and between intermediate portions of the upper and lower side members, a rear intermediate vertical member connected to and between the upper and lower rear cross members, seat means extending forwardly from the upper rear cross member and having a portion slidably adjustable in said rear intermediate vertical member, and casters at the junctures of the lower longitudinal side members and at the front ends of the lower longitudinal side members with the lower rear cross members, crutch means carried by the frame and extending from the upper longitudinal side members and slidable in said intermediate vertical members, ground engaging brake means slidable through said lower rear cross member, brake operating means having a portion slidable through said upper rear cross member at each side of said seat means, and latch means mounted on said upper rear cross member and engaging a portion of said brake operating means for holding the same in inoperative position.

JOSEPH H. KASTEN.
HENRY McINTOSH.